April 29, 1952  W. L. KAUFFMAN, II  2,595,148
DRIVE AND WRINGER ROTATION LOCK FOR WRINGERS
Filed Aug. 7, 1946  2 SHEETS—SHEET 1

INVENTOR.
Walter L. Kauffman II
BY Ralph Hammar
attorney

Patented Apr. 29, 1952

2,595,148

UNITED STATES PATENT OFFICE 2,595,148

DRIVE AND WRINGER ROTATION LOCK FOR WRINGERS

Walter L. Kauffman, II, Erie, Pa., assignor to Lovell Manufacturing Company, Erie, Pa., a corporation of Pennsylvania Application August 7, 1946, Serial No. 689,043

6 Claims. (Cl. 68—255)

This invention is intended to interlock the wringer driving and indexing in such a manner as to prevent unintentional operation of the wringer except when in the selected index position. In a preferred form, the wringer drive gearing is latched in driving position and is unlatched by the initial movement of the gear shift handle, by unlocking of the wringer index, and by the instinctive reaction of the operator. In addition to a more sensitive control, the operator is not prevented from performing any control function. Further objects and advantages appear in the specification and claims.

Figure 1:
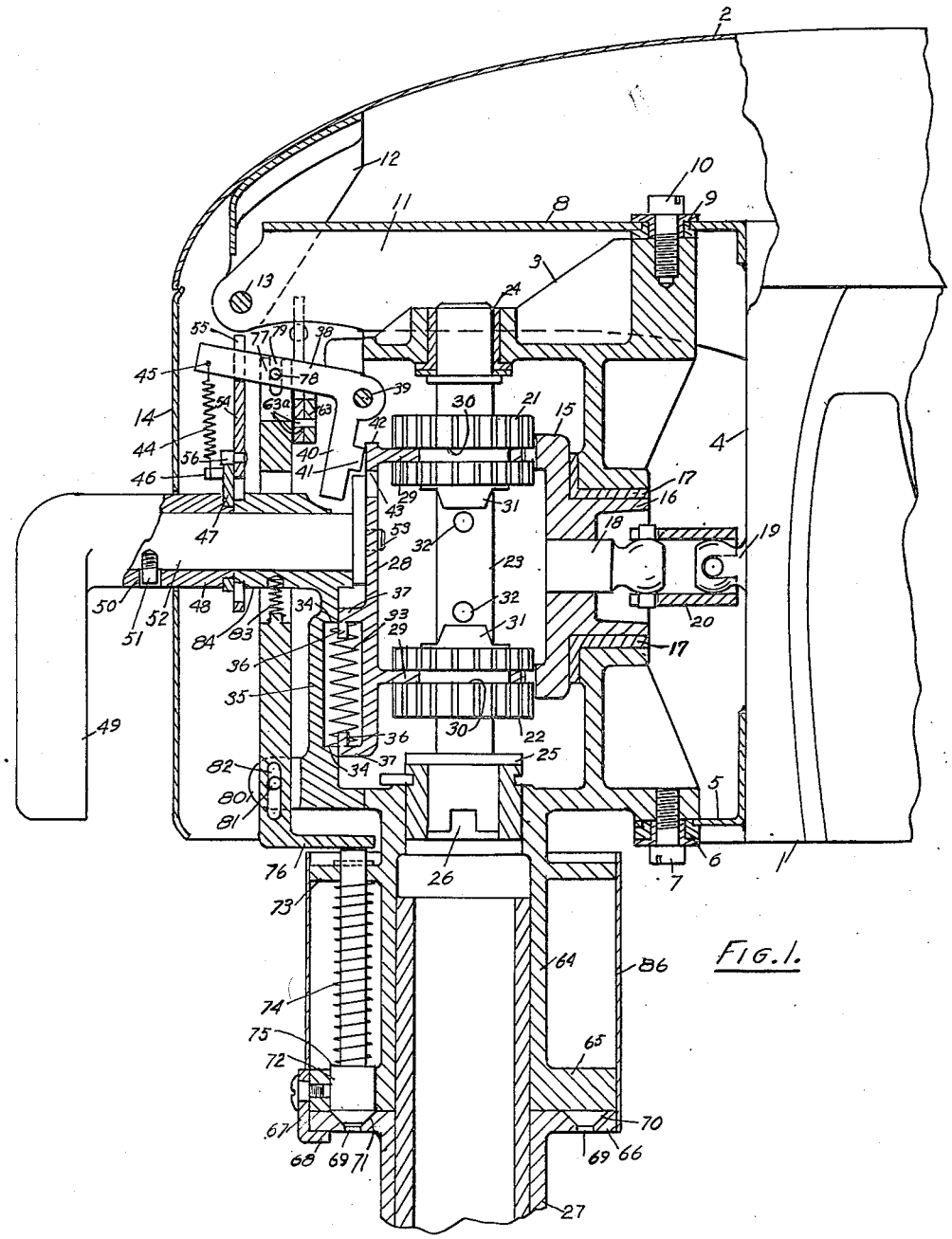
Figure 2:
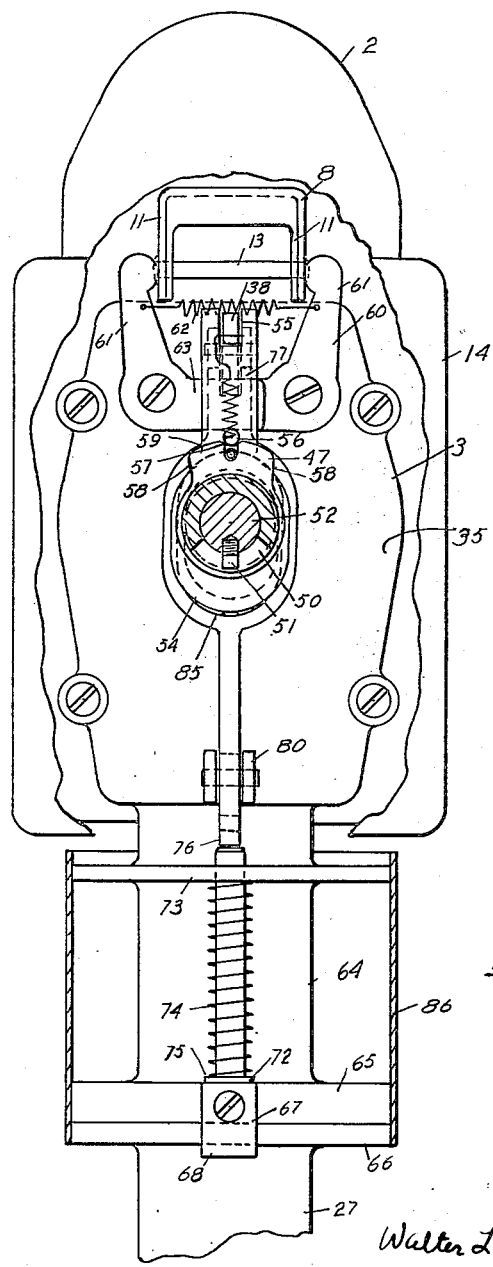

In the drawing, Fig. 1 is a fragmentary sectional elevation of a wringer, and Fig. 2 is an end elevation.

Referring to the drawing, 1 and 2 indicate bottom and top frames of a wringer. Only the part of the frame adjacent the wringer head 3 is shown since the other part may be of conventional construction. Adjacent the wringer head the bottom frame has a side stile 4 having at its lower end a bracket 5 pivoted on a bushing 6 fixed to the under side of the wringer head by a screw 7. At the upper end of the side stile is fixed a channel shaped bracket 8 pivoted on a bushing 9 fixed to the upper side of the wringer head by a screw 10. This permits pivoting of the wringer relative to the wringer head under the instinctive reaction of the operator which, as hereinafter described, is used to operate a safety release.

The depending sides 11 of the bracket 8 extend between a channel shaped hinge member 12 fixed to the under side of the top frame 2 and are hinged thereto by a hinge pin 13. This permits the top frame to swing upward about the hinge pin to release the pressure between the wringer rolls when the pressure release (not shown) is actuated. The wringer head is enclosed by a skirt 14 which may be integral with or fixed to the bottom frame.

The wringer is driven by a crown gear 15 having a hub 16 journalled in a bearing 17 in the wringer head. A stub shaft 18 fixed to the crown gear is coupled to the lower roll shaft 19 by a universal coupling 20. The crown gear meshes continuously with upper and lower pinions 21 and 22 loose on a shaft 23 journalled in upper and lower guide bearings 24 and 25. At the lower end of the shaft 23 is a slot 26 for receiving a tang of a drive shaft extending up through a wringer post 27. The pinions 21 and 22 are positioned on the drive shaft 23 by a carrier 28 having forks 29 fitting in grooves 30 in the pinions. The carrier is shown in the neutral position in which clutch teeth 31 on the pinions are disengaged from clutch pins 32 in the shaft 23. The carrier is spring biased to the neutral position by a compression spring 33 confined between shoulders 34 in an end plate 35 for the wringer head. The ends of the spring 33 fit over pins 36 on projections 37 integral with the carrier 28.

In the neutral position shown, the spring-engaging faces of the projections 37 are in line with the shoulders 34. Upon movement of the carrier in either direction from the neutral position, the spring 33 will be compressed between a shoulder 34 at one end of the spring and a projection 37 at the opposite end of the spring, thus producing a force tending to return the carrier to neutral. The strength of the spring 33 is selected so that the restoring force is sufficient for light load operation. Under heavier loads an additional restoring force proportional to the wringer torque is obtained from the reaction of the tapered sides of the clutch teeth 31 against the clutch pins 32.

The gearing is latched in the driving position by a bell crank 38 pivoted at 39 on the end plate 35 and having an arm 40 provided with a latching projection 41. In the lowermost position of the carrier the latching projection engages the upper edge 42 of the carrier. In the uppermost position of the carrier the latching projection extends through a recess 43 in the carrier. The latch is biased to the engaged position by a tension spring 44 arranged between a pin 45 on the bell crank lever and a pin 46 on a cam plate 47 fixed to the hub 48 of a shift lever 49. The hub 48 has an elongated slot 50 receiving the head of a set screw 51 in a shaft 52. The slot and set screw provide a lost motion connection between the shift lever and the shaft. The shaft 52 has a crank pin 53 which cooperates with the carrier 28 to move it up or down upon rotation of the shaft.

The lost motion between the shift lever 49 and the shaft 52 is used to move the latch 41 to the disengaged position prior to movement of the shaft 52. This is accomplished by a latch plate 54 having an opening 55 fitting over the outer end of the bell crank lever 38. The tension spring 44 urges the latch plate 54 downward and holds a pin 56 against the cam plate 47. In the neutral position shown the pin 56 fits in a shallow detent recess 57. In the driving positions the pin 56 rests on one of the shoulders 58 which permits downward movement of the latch plate 54 and accordingly permits movement of the latch 41 to the latching position.

Upon movement of the shift lever 49 from the neutral position to the driving position, the pin 56 drops onto one of the shoulders 58 after the gears have reached the driving position. Upon movement of the shift lever from the driving position toward the neutral position, the initial movement of the shift lever cams the pin 56 onto the central surface 59 of the cam plate 47, moving the latch plate 54 upward and accordingly moving the latch 41 to the disengaged position. This unlatching movement takes place before the lost motion between the shift lever 49 and the shaft 52 is taken up.

The latch 41 is released under the instinctive reaction of the operator through bell cranks 60 having arms 61 connected by a spring 62 and held against the depending sides 11 of the bracket 8 and arms 63 are connected to move together, for example by a pin and slot connection 63a. Upon pivotal movement of the wringer about the bushings 6 and 9, both of the bell cranks 60 are pivoted in a direction to move the arms 63 upward and thereby move the latch 41 in the releasing direction. If the pivotal movement is insufficient to completely release the latch 41, the spring 62 returns the wringer to a central position. Although the latch 41 may remain in a partially released position, the position of the latch does not interfere with the centering of the wringer. The magnitude of the pivotal movement of the wringer necessary to release the latch remains the same. This is an important feature since, if the latch 41 and the bell cranks 60 were connected so that the position of the bell cranks always corresponded to the position of the latch, a slight pivotal movement of the wringer would result in lost motion between the arms 61 and the sides 11 of the bracket 8. Under a succession of small thrusts on the wringer, each insufficient to produce the necessary pivotal movement to release the latch 41, the latch 41 would creep toward the released position and would finally release. In the present construction while the latch 41 may creep, the force required to release the wringer remains substantially constant since the wringer returns to the central position after each thrust.

At the lower end of the wringer head 3 is a tubular extension 64 journalled on the wringer post 27 and having at its lower end a flange 65 resting on a thrust collar 66 fixed to the wringer post. The flange 65 is held against the thrust collar 66 by a bracket 67 fixed to the flange 65 and having an ear 68 hooked over the thrust collar. In the thrust collar 66 are a series of locating holes 69, each of which has a chamfered surface 70 receiving the tapered lower end 71 of an index pin 72 slidably carried in the flange 65 and in an ear 73 projecting from the tubular extension 64 of the wringer head. A compression spring 74 arranged between the under side of the ear 73 and a shoulder 75 on the index pin urges the index pin downward into engagement with the locating hole and yieldably indexes the wringer in the selected index position.

The taper on the surfaces 70 and 71 and the strength of the spring 74 determines the resistance to movement of the wringer from the index position. This resistance is normally selected so that the wringer is kept in the selected index position under all normal wringing loads. Under excessive wringing loads the driving torque reaction causes the surfaces 70 and 71 to be cammed apart, raising the index pin until it is clear of the locating hole 69. The raising of the index pin is transmitted through a bracket or slide 76 engaging the upper end of the index pin and having a fork 77 at its upper end straddling the projecting arm of the bell crank lever 38 carrying the latch 41. The lower end of the bracket is guided between ears 80 on the wringer head carrying a pin 81 fitting in a slot 82 in the bracket. The bracket is held against the upper end of the index pin by a spring 83 arranged between the under side of a boss 84 on the wringer head and the bottom of a portion 85 of the bracket straddling the boss.

A pin 78 fixed in the lever 38 is slidably received in slots 79 in the forked end 77. The bottoms of the slots 79 are arranged so that upon movement of the index pin out of the locating hole 69, the latch 41 is moved to the released position. Since only upward movement of the bracket 76 is effective to release the latch, the wringer remains in the indexed position whenever the latch is released either by operation of the shift lever 49 or by the instinctive reaction of the operator. The amount of upward movement of the index pin necessary to release the latch is unaffected by creeping of the latch toward the released position. Because there is no need to operate the index pin 72 manually, the index pin is enclosed by a skirt 86.

Although there is in effect an interlock between the wringer index and the driving mechanism, the interlock is such that the operator is not prevented from performing any control operation. When the wringer is between the index positions, the latch 41 is in the released position so that while the operator is free to move the gears to the driving position by the shift lever 49, the gears will not remain in the driving position until the wringer has been moved to one of the index positions.

When the operator wishes to move the wringer from one index position to another, the wringer is pushed in the desired direction. The initial push on the wringer operates the bell cranks 60 so as to move the latch 41 to the released position. If, for any reason, the bell cranks 60 fail to operate, the thrust on the wringer cams the index pin 72 out of the locating hole 69 and thereby releases the latch 41. The release of the latch 41 also takes place under stalled conditions due to the torque reaction and upon the initial movement of the shift lever 49 from a driving position toward neutral. All of these control functions can be made very sensitive because the driving mechanism is of the type which is latched in the driving position and which is released by the tripping of a latch. The sensitivity is further increased by the torque compensation provided by the tapered surfaces of the clutch teeth 31 which permit the releasing force to remain substantially constant for all loads.

What I claim as new is:

1. In a wringer having a head mountable for swinging movement on a wringer post and having roll drive gearing of the type biased to neutral by spring and torque action and with latch means holding the gearing in the driving position, the combination of a wringer frame mounted for movement relative to the head under the instinctive reaction of the user, index means swingable with the wringer for yieldably holding the head in any one of a plurality of angular positions including a surface cammed away from the post by movement of the head from the selected position, and releasing means for said latch means including a slide operated by said camming movement and having another operative connection actuated by the movement of the wringer frame relative to the head under the instinctive reaction of the user.

2. In a wringer having a head mountable for swinging movement on a wringer post and having roll drive gearing of the type biased to neutral by spring and torque action and with latch means holding the gearing in the driving position, the combination of a wringer frame mounted for movement relative to the head under the instinctive reaction of the user, index means comprising cooperating parts engageable in any selected one of a plurality of angular positions and when engaged resiliently centering the head and resisting movement of the head from the selected index position with a force greater than the reaction due to the wringing torque during normal wringing and less than the reaction due to the wringing torque under stalling overload, one of the cooperating parts being on and swinging with the head and the other of the parts being on the wringer post, and releasing means for said latch means including a slide actuated by unlocking movement of the index means and having another operative connection actuated by movement of the wringer frame relative to the head under the instinctive reaction of the user.

3. In a wringer having a head mountable for swinging movement on a wringer post and having roll drive gearing of the type biased to neutral by spring and torque action and with latch means holding the gearing in the driving position, the combination of a wringer frame mounted for movement relative to the head under the instinctive reaction of the user, index means comprising cooperating parts engageable in any selected one of a plurality of index positions and when engaged resiliently centering the wringer head and resisting movement of the head from the selected index position with a force greater than the reaction due to the wringing torque during normal wringing and less than the reaction due to the wringing torque under stalling overloads, one of the cooperating parts being on the wringer post and the other of the cooperating parts being on the wringer head, a shift lever for the gearing, and releasing means for said latch means and including an element having different portions thereof operatively connected to and operable independently by the shift lever, by the movement of the wringer frame relative to the head under the instinctive reaction of the user, and by unlocking movement of the index means.

4. In a swinging wringer, a drive head having provisions for mounting for swinging movement on a wringer support, drive gearing in the head, a roll carrying frame articulated to the head, means centering the frame on the head, a safety release having an operative connection actuated by articulation of the frame relative to the head from its centered position, a cam faced plunger on the head for cooperating with detents in the support to locate the wringer head in any selected one of a plurality of angular positions relative to the wringer support, means biasing the plunger into engagement with the detents to yieldingly locate the head in the selected index position, said plunger being cammed out of the detents upon swinging of the head relative to the support, and an operative connection between the plunger and the gearing for causing return of the gears to neutral upon camming of the plunger out of the index detents.

5. In a swinging wringer, a drive head having provisions for mounting for swinging movement on a wringer support, gearing in the head movable to driving and neutral positions, means for yieldingly indexing the head in any one of a plurality of angular positions on the support comprising cam means on and movable relative to the head and biased into engagement with cooperating detents on the support, said cam means being cammed away from the detents upon swinging of the head relative to the support, a wringer frame articulated to the head, means centering the frame on the head, a safety release having an operative connection actuated by articulation of the frame relative to the head, and an operative connection between the cam means and the gearing causing movement of the drive gearing to neutral upon camming of the cam means away from the index detents.

6. In a wringer of the type having a wringer head including a roll drive gear system, a support post for swingably mounting the wringer head, and indexing means including interengaging cam-faced index parts on said head and post for yieldably indexing the head on said post; a roll supporting frame swingable on said head under the instinctive action of a user, a gear shift lever, an element for latching the drive gear system in operative or inoperative position, and separate operative connections between the index means, the gear shift lever, and the frame, respectively, to said element at different portions thereof, whereby the drive gear system may be released either by operation of said gear shift lever, by instinctive swinging of the frame, or by swinging of said head.

WALTER L. KAUFFMAN, II.

REFERENCES CITED

The following references are of record in the file of this patent:

UNITED STATES PATENTS

| Number | Name | Date |
|---|---|---|
| 1,385,692 | Lamb | July 26, 1921 |
| 1,853,919 | Moore | Apr. 12, 1932 |
| 2,013,261 | Wenger | Sept. 3, 1935 |
| 2,216,398 | Kauffman | Oct. 1, 1940 |
| 2,259,824 | Lowder | Oct. 21, 1941 |
| 2,297,997 | Behan | Oct. 6, 1942 |
| 2,314,709 | Kauffman | Mar. 23, 1943 |
| 2,336,233 | Dunham | Dec. 7, 1943 |
| 2,369,333 | Bottinelli | Feb. 13, 1945 |
| 2,388,207 | Etten | Oct. 30, 1945 |
| 2,406,788 | Barcus | Sept. 3, 1946 |
| 2,435,536 | Ferris | Feb. 3, 1948 |
| 2,446,477 | Kauffman | Aug. 3, 1948 |
| 2,536,324 | Stickel | Jan. 2, 1951 |
| 2,537,401 | Ferris | Jan. 9, 1951 |